(12) United States Patent
Yarabolu (10) Patent No.: US 12,417,582 B2
(45) Date of Patent: Sep. 16, 2025

(54) SYSTEM AND METHOD FOR VERIFYING USER INTERACTIONS IN AN EXTENDED REALITY ENVIRONMENT

(71) Applicant: Bank of America Corporation, Charlotte, NC (US)

(72) Inventor: Vijay Kumar Yarabolu, Hyderabad (IN)

(73) Assignee: Bank of America Corporation, Charlotte, NC (US)

(*) Notice: Subject to any disclaimer, the term of this patent is extended or adjusted under 35 U.S.C. 154(b) by 183 days.

(21) Appl. No.: 18/473,798

(22) Filed: Sep. 25, 2023

(65) Prior Publication Data
US 2025/0104341 A1 Mar. 27, 2025

(51) Int. Cl.
*H04L 9/32* (2006.01)
*G06F 3/01* (2006.01)
*G06T 17/00* (2006.01)

(52) U.S. Cl.
CPC .............. *G06T 17/00* (2013.01); *G06F 3/012* (2013.01); *G06F 3/013* (2013.01); *G06F 3/014* (2013.01); *H04L 9/3213* (2013.01)

(58) Field of Classification Search
CPC .......... G06F 3/012; G06F 3/013; G06F 3/017; H04L 9/3213; H04L 9/32; G06T 17/00
See application file for complete search history.

(56) References Cited

U.S. PATENT DOCUMENTS

| | | | |
|---|---|---|---|
| 8,527,640 B2 | 9/2013 | Reisman | |
| 10,164,985 B2 | 12/2018 | Turgeman | |
| 10,395,018 B2 | 8/2019 | Turgeman | |
| 10,586,036 B2 | 3/2020 | Turgeman | |
| 10,904,246 B2 | 1/2021 | Chari | |
| 11,049,082 B2 | 6/2021 | Rice | |
| 11,151,234 B2 | 10/2021 | Kontsevich et al. | |
| 11,330,012 B2 | 5/2022 | Turgeman | |
| 11,470,161 B2 | 10/2022 | Senftleber et al. | |

(Continued)

OTHER PUBLICATIONS

Deb Radcliff; "The metaverse brings new breed of threats to challenge privacy and security gatekeepers;" CSO; https://www.csoonline.com/article/3686052/the-metaverse-brings-a-new-breed-of-threats-to-challenge-privacy-and-security-gatekeepers.html; Jan. 23, 2023.

(Continued)

*Primary Examiner* — Dennis P Joseph (57) ABSTRACT

A method includes rendering, on displays of an extended reality (XR) device, an XR environment, detecting a sequence of user interactions with an XR application, and identifying, based on the sequence of user interactions with the XR application and the user identification, a historical user interaction data associated with a user. The method further includes generating a first trust token based on the identified historical user interaction data, and receiving an interaction to finalize execution of the sequence of user interactions. In response, the method includes accessing a second trust token associated with the XR application, comparing the first trust token with the second trust token, validating the second trust token based on the comparison, validating each user interaction of the sequence of user interactions based on the identified historical user interaction data, and finalizing execution of the sequence of user interactions in response to the validations.

20 Claims, 4 Drawing Sheets

(56) References Cited

U.S. PATENT DOCUMENTS

| | | | |
|---|---|---|---|
| 11,546,331 B2 | 1/2023 | Senftleber et al. | |
| 11,601,398 B2 | 3/2023 | Senftleber et al. | |
| 11,657,815 B2 | 5/2023 | Tran et al. | |
| 2017/0346851 A1 | 11/2017 | Drake | |
| 2018/0115551 A1 | 4/2018 | Cole | |
| 2018/0129276 A1 | 5/2018 | Nguyen et al. | |
| 2021/0226952 A1 | 7/2021 | Senftleber et al. | |
| 2021/0279695 A1 | 9/2021 | Rice | |
| 2022/0050983 A1 | 2/2022 | Spivack | |
| 2022/0247678 A1 | 8/2022 | Atwal et al. | |
| 2023/0360007 A1* | 11/2023 | Krishnaswamy | G06Q 20/389 |
| 2023/0403152 A1* | 12/2023 | Feijoo | H04L 9/0894 |
| 2024/0143721 A1* | 5/2024 | Naik | G06T 19/006 |
| 2024/0211910 A1* | 6/2024 | Lal | G06Q 40/04 |

OTHER PUBLICATIONS

Security; "9 security threats in the metaverse;" https://www.securitymagazine.com/articles/98142-9-security-threats-in-the-metaverse; Aug. 10, 2022.

Ashwin Krishnan; "Top metaverse cybersecurity challenges: How to address them;" Tech Target; https://www.techtarget.com/searchsecurity/tip/Top-metaverse-cybersecurity-challenges-to-consider; Nov. 18, 2022.

Ramprakash Ramamoorthy, Zoho Corporation; "Why the metaverse is filled with security, privacy and safety issues;" https://venturebeat.com/security/why-the-metaverse-is-filled-with-security-privacy-and-safety-issues/; Sep. 26, 2022.

* cited by examiner

_(12) United States Patent_

SYSTEM AND METHOD FOR VERIFYING USER INTERACTIONS IN AN EXTENDED REALITY ENVIRONMENT

TECHNICAL FIELD

The present disclosure relates generally to extended reality environments, and, more specifically, to a system and method for verifying user interactions in an extended reality environment.

BACKGROUND

Some institutions may provide applications suitable for extended reality (XR) environments (e.g., virtual-reality (VR) environments, augmented-reality (AR) environments, mixed-reality (MR) environments, and so forth), which may allow users to perform interactions in XR. As the number of users and associated user avatars interacting with such applications increases, users may perform sensitive user interactions and exchange sensitive data within XR environments. However, many existing XR security processes rely primarily on the service executing and hosting an XR environment, and thus securing particular applications executing within the XR environment and the user interactions therewith may be impeded.

SUMMARY

The system and methods implemented by the system as disclosed in the present disclosure provide technical solutions to the technical problems discussed above by providing systems and methods for verifying and authenticating user interactions within extended reality (XR) environments. The disclosed system and methods provide several practical applications and technical advantages.

The present embodiments are directed to systems and methods for verifying and authenticating user interactions within XR environments. In particular embodiments, one or more processors of a computing system may render, on one or more displays of an XR device, an XR environment. For example, in one embodiment, the XR environment may be configured to facilitate user interactions with the plurality of XR applications while executing within the XR environment. In particular embodiments, the one or more processors may then detect, based on sensor data obtained from one or more sensors of the XR device, a sequence of user interactions with at least one XR application of the plurality of XR applications.

In particular embodiments, the one or more processors may then identify, based at least in part upon the sequence of user interactions with the at least one XR application and a user identification, a historical user interaction data associated with the user. For example, in particular embodiments, the one or more processors may be configured to identify the historical user interaction data by deriving a relational graph based on the sequence of user interactions with the at least one XR application and the user identification. In particular embodiments, the derived relational graph may include a plurality of nodes each corresponding to a respective one of the sequence of user interactions with the at least one XR application, in which a final node of the derived graph relation corresponds to the interaction to finalize execution of the sequence of user interactions. In particular embodiments, the identified historical user interaction data may include one or more of a head pose pattern of the user, an eye gaze pattern of the user, a hand gesture pattern of the user, a body movement pattern of the user, or a clickstream of the user.

In particular embodiments, the one or more processors may then generate a first trust token based on the identified historical user interaction data. For example, in particular embodiments, the one or more processors may determine, based on the sensor data, one or more device-specific patterns associated with the XR device, and generate the first trust token based on the identified historical user interaction data and the one or more device-specific patterns. In particular embodiments, the one or more processors may then receive an interaction to finalize execution of the sequence of user interactions. In particular embodiments, in response to receiving the interaction to finalize execution of the sequence of user interactions, the one or more processors may then access a second trust token associated with the at least one XR application and compare the first trust token with the second trust token.

For example, in particular embodiments, the one or more processors may receive, from the at least one XR application, the second trust token, which may include an access token configured to permit access to an application programming interface (API) associated with the at least one XR application. The one or more processors may then validate the second trust token based at least in part upon the comparison of the first trust token with the second trust token. For example, in one embodiment, the one or more processors may validate the second trust token based at least in part upon whether the first trust token matches to the second trust token. In particular embodiments, the one or more processors may then validate each user interaction of the sequence of user interactions based at least in part upon the identified historical user interaction data.

In particular embodiments, in response to validating the second trust token and the user interactions of the sequence of user interactions, the one or more processors may then finalize execution of the sequence of user interactions. For example, in particular embodiments, the one or more processors may be configured to finalize execution of the sequence of user interactions by causing the at least one XR application to execute a predetermined action.

The disclosed system and method provide the additional practical application of improving interoperability and security of extended reality (XR) systems (e.g., virtual reality (VR) systems, augmented reality (AR) systems, mixed (MR) systems, and so forth) by way of providing a multi-factor authentication (MFA) process suitable specifically for XR environments. In this way, sensitive information may be seamlessly and securely shared between XR environments and XR applications executing within the XR environments to implement data security, verification and authentication of user interactions, access to an extended reality environment (e.g., metaverse environment, VR environment, AR environment, MR environment, or some combination thereof) and/or XR applications, access to entities within the XR environment, and/or other data interactions performed in both real-world and XR environments.

For example, in accordance with the presently disclosed embodiments, an XR service layer may allow a user wearing an XR device to perform an initial XR service authentication upon launch of an XR environment on the XR device. The XR service layer may then track (e.g., in the background) sequences of user interactions as the user interacts with various XR applications within the XR environment and identify a historical user interaction pattern and a service trust token based thereon. In particular embodiments, upon determining that the user intends to finalize an execution of a particular sequence of user interactions with a particular XR application, the XR service layer may request an access trust token from the particular XR application for comparison with the service trust token in order to verify and authenticate the user with respect to the particular XR application.

Upon verifying and authenticating the user with respect to the particular XR application, the XR service layer may then generate and verify a navigation trust score for the user by comparing each user interaction of the particular sequence of user interactions with the particular XR application with the identified historical user interaction pattern to verify and authenticate that this particular user is in fact the user that performed the particular sequence of user interactions. The XR service layer may then allow finalization of the execution of the particular sequence of user interactions with the particular XR application only when the XR service layer has determined that each user interaction of the particular sequence of user interactions with the particular XR application matches to the identified historical user interaction pattern. Thus, the disclosed system and methods improve XR systems by providing a verification and authentication process specifically suited for XR environments to secure sensitive data and user interactions exchanged and/or executed within XR environments.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Example System

Figure 1:
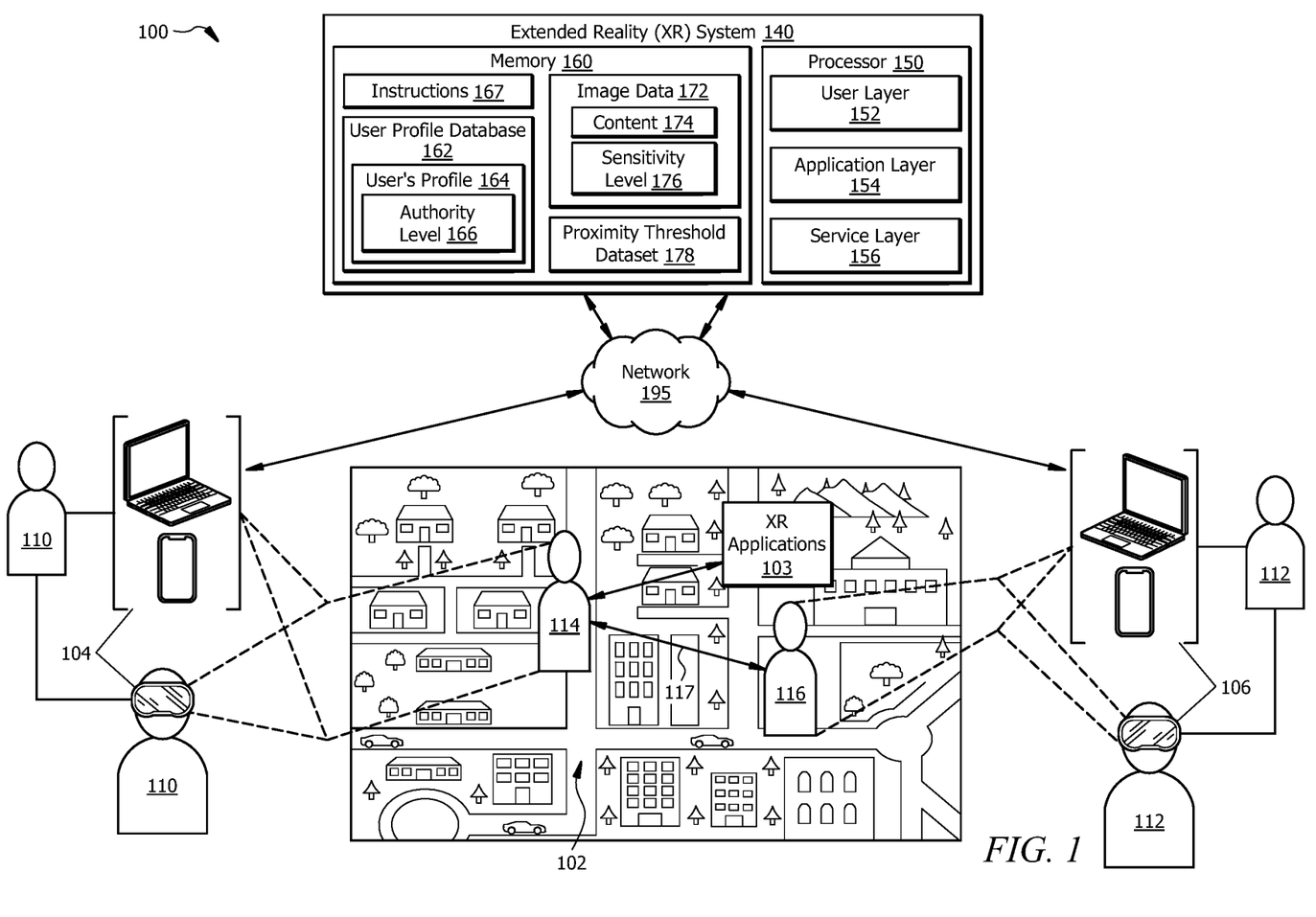
FIG. 1 is a block diagram of a system of an extended reality (XR) system and network, in accordance with certain aspects of the present disclosure.

FIG. 1 is a block diagram of an extended reality (XR) system and network 100, in accordance with certain aspects of the present disclosure. In particular embodiments, the system and network 100 may include a first XR device 104, a second XR device 106, real-world server 130, and a XR system 140, each connected to a network 195. A first user 110 is associated with the first XR device 104 and a second user 112 is associated with the second XR device 106. The system and network 100 may be communicatively coupled to the network 195 and may be operable to transmit data between each one of the first XR device 104, the second XR device 106, and the XR system 140 through the network 195.

In particular embodiments, the system and network 100 may improve interoperability and security of extended reality (XR) systems (e.g., virtual reality (VR) systems, augmented reality (AR) systems, mixed (MR) systems, and so forth) so that information may be seamlessly and securely shared between these systems to implement data security, authorization and authentication of data interactions, access to an extended reality environment 102 (e.g., metaverse environment, VR environment, AR environment, MR environment, or some combination thereof), access to entities within the extended reality environment 102 and other data interactions performed in real-world and extended reality environments. For example, user information or sensor data retrieved from a user and/or a user's XR device in a real-world environment may be used in the extended reality environment 102 to determine whether to restrict or allow access to a particular XR application 103 or one or more particular rendered objects associated with the particular XR application 103 within the extended reality environment 102 and/or to perform any kind of action or interaction with the particular XR application 103 or the one or more particular rendered objects associated with the particular XR application 103.

Additionally, or alternatively, user information collected from the first user 110 and/or assigned to the first user 110 in the real-world environment or extended reality environment 102 may be used in the extended reality environment 102 to provide the first user 110 access to products, services and/or experiences within the extended reality environment 102. This process provides improved information security because it authenticates that a first avatar 114 is associated with the first user 110, not an unauthorized party, and that the first user 110 is authorized to access the extended reality environment 102, obtain products, services and experiences within the extended reality environment 102 and perform data interactions. Further, a user may obtain a product, service or experience by transferring real-world data objects between real-world entities based on data interactions performed in the extended reality environment 102.

In particular embodiments, the first user 110 may access the extended reality environment 102 through the first XR device 104. The first XR device 104 is configured to display a two-dimensional (2D) or three-dimensional (3D) representation of the extended reality environment 102 to the first user 110. Examples of an extended reality environment 102 may include, but are not limited to, a graphical or virtual representation of a metaverse, a map, a building interior, a landscape, a fictional location, an alternate reality, or any other suitable type of location or environment. The extended reality environment 102 may be configured to use realistic or non-realistic physics for the motion of objects and allow the avatars 114, 116 to interact with one or more XR applications 103 within the extended reality environment 102. For example, some extended reality environments 102 may be configured to use gravity whereas other extended reality environments 102 may not be configured to use gravity. Within the extended reality environment 102, each user may be associated with an avatar (such as the first avatar 114 for the first user 110). An avatar is a graphical representation of a user at a virtual location within the extended reality environment 102.

In particular embodiments, the virtual location of each avatar 114, 116 may be correlated to the physical location of each respective user 110, 112 in the real-world environment. Examples of avatars 114, 116 may include, but are not limited to, a person, an animal, or an object. In some embodiments, the features and characteristics of the avatars 114, 116 may be customizable, and user defined. For example, the size, shape, color, attire, accessories, or any other suitable type of appearance features may be specified by a user. By using the avatars 114, 116, the respective users 110, 112 may be able to move within the extended reality environment 102 to interact with one or more avatars and objects within the extended reality environment 102 while independently remaining at a physical location in the real-world environment or being in transit in the real-world environment.

While engaging in the extended reality environment 102 via the first avatar 114, the first user 110 may interact with a number of other users, objects and/or entities through a respective avatar. For example, the second user 112 may attempt to engage in an interaction session with the first avatar 114 through a second avatar 116 associated with the second user 112. In another example, the first avatar 114 of the first user 110 may access an extended reality sub-environment (not shown) within the extended reality environment 102 and perform virtual data interactions within the virtual sub-environment. In the real-world environment, the second user 112 may be physically located at a distance away from the first user 110. The second user 112 may access the extended reality environment 102 through the second XR device 106 to control the second avatar 116 and attempt to engage in an interaction session with the first user 110 through the first avatar 114.

Before the interaction between the first avatar 114 and the second avatar 116 occurs, the XR system 140 may authenticate that the first avatar 114 is associated with the first user 110 and not an unauthorized third-party. For example, the first user 110 may be required to sign into a secure portal that provides access to a data file associated with the first user 110. In some examples, a real-world data file of the first user 110 and a first virtual data file of the first user 110 may be stored and managed by the XR system 140. Similarly, a second virtual data file associated with the second user 112 is managed by the XR system 140.

In particular embodiments, the XR system 140 may store other information related to the first user 110 including, but not limited to, users' profile 162, account information (e.g., including identity and other details relating to users 110, 112), avatar information, digital assets information, or any other suitable type of information that is associated with a user within the extended reality environment 102 and/or the real-world environment. As depicted in FIG. 1, the XR system 140 may include a processor 150 and a memory 160. The processor 150 may include one or more processors operably coupled to the memory 160. In some embodiments, the processor 150 may be any electronic circuitry including, but not limited to, state machines, one or more central processing unit (CPU) chips, logic units, cores (e.g., a multi-core processor), field-programmable gate array (FPGAs), application specific integrated circuits (ASICs), or digital signal processors (DSPs). In other embodiments, the processor 150 may be a programmable logic device, a microcontroller, a microprocessor, or any suitable combination of the preceding.

In particular embodiments, the processor 150 is communicatively coupled to and in signal communication with the memory 160. The processor 150 may be configured to process data and may be implemented in hardware or software. For example, the processor 150 may be 8-bit, 16-bit, 32-bit, 64-bit or of any other suitable architecture. The processor 150 may include an arithmetic logic unit (ALU) for performing arithmetic and logic operations, processor registers that supply operands to the ALU and store the results of ALU operations, and a control unit that fetches instructions 167 from memory 160 and executes them by directing the coordinated operations of the ALU, registers and other components.

In particular embodiments, the processor 150 may be configured to implement various instructions 167. For example, the processor 150 may be configured to execute the instructions 167 to implement the XR system 140. In this way, processor 150 may be a special-purpose computer designed to implement the functions disclosed herein. In particular embodiments, the XR system 140 is implemented using logic units, FPGAs, ASICs, DSPs, or any other suitable hardware. The XR system 140 is configured to operate as described below with reference to FIGS. 2 and 4, for example. For example, the processor 150 may be configured to perform at least a portion of the method 400 as described in FIG. 4. In particular embodiments, as will be discussed in greater detail below, the processor 150 may include a user layer 152, an application layer 154, and an XR service layer 156.

In particular embodiments, the memory 160 may include one or more disks, tape drives, or solid-state drives, and may be used as an over-flow data storage device, to store programs when such programs are selected for execution, and to store instructions 167 and data that are read during program execution. The memory 160 may be volatile or non-volatile and may comprise a read-only memory (ROM), random-access memory (RAM), ternary content-addressable memory (TCAM), dynamic random-access memory (DRAM), and static random-access memory (SRAM). In particular embodiments, the memory 160 is operable to store users' profiles 162, a first user's profile 164, an authority level 166, image data 172, content 174, a sensitivity level 176, and a proximity threshold dataset 178. In particular embodiments, the image data 172 may include any pixel data or voxel data that may be utilized to render and display the extended reality environment 102 (including XR application 103 and avatars 114, 116) onto respective displays of the XR devices 104 and 106 of the first user 110 and the second user 112, respectively.

In particular embodiments, network 195 may include all or a portion of a local area network (LAN), a wide area network (WAN), an overlay network, a software-defined network (SDN), a virtual private network (VPN), a packet data network (e.g., the Internet), a mobile telephone network (e.g., cellular networks, such as 4G or 5G), a Plain Old Telephone (POT) network, a wireless data network (e.g., WiFi, WI Gig, WiMax, etc.), a Long Term Evolution (LTE) network, a Universal Mobile Telecommunications System (UMTS) network, a peer-to-peer (P2P) network, a Bluetooth network, a Near Field Communication network, a Zigbee network, and/or any other suitable network, operable to facilitate communication between the components of system and network 100. In other embodiments, system and network 100 may not have all of these components and/or may have other elements instead of, or in addition to, those above.

While the present embodiments may be discussed herein primarily with respect to XR devices 104, 106 being suitable for rendering and displaying the extended reality environment 102 (including XR application 103 and avatars 114, 116), it should be appreciated that the XR devices 104, 106 may be any user computing devices configured to communicate with other devices, such as a server (e.g., XR system 140), databases, etc. through the network 195. Each of the user devices may be configured to perform specific functions described herein and interact with the XR system 140, e.g., via respective user interfaces. Each of the XR devices 104, 106 is a hardware device that is generally configured to provide hardware and software resources to the first user 110 and the second user 112, respectively.

Examples of the XR devices 104, 106 include, but are not limited to, a VR device, an AR device, an MR device, a laptop, a computer, a smartphone, a tablet, a smart device, an Internet-of-Things (IoT) device, or some combination thereof. In particular embodiments, the XR devices 104, 106 may each include one or more displays, a touchscreen, a touchpad, keys, buttons, a mouse, or any other suitable type of hardware that allows the respective users 110, 112 to view data and/or to provide inputs into the XR devices 104, 106. In particular embodiments, the XR devices 104, 106 may also each include any number of sensors suitable for detecting and tracking sensor data (e.g., telemetry data) associated with one or more of the XR devices 104, 106, the users 110, 112, the avatars 114, 116, and/or the one or more XR applications 103.

For example, in particular embodiments, the number of sensors may include one or more of inertial measurement units (IMUs), one or more monochromatic cameras, one or more visible-light cameras (VLCs), one or more infrared (IR) cameras, one or more depth cameras, one or more accelerometers, one or more magnetometers, one or more gyroscopes, or other sensors that may be suitable for detecting and tracking a head pose of the respective users 110, 112, an eye gaze of the respective users 110, 112, a hand gesture of the respective users 110, 112, a face of the respective users 110, 112, a body movement of the respective users 110, 112, a haptic control of the respective users 110, 112, a spatial proximity of the avatars 114, 116 with respect to one or more rendered objects associated with the XR application 103, an object pose of one or more rendered objects associated with the XR application 103.

In particular embodiments, as previously noted, the processor 150 may include the user layer 152. The user layer 152 may include any software layer or software system (e.g., user interfaces (UIs), graphical user interfaces (GUIs), buttons, menus, text boxes, widgets, objects, event handlers, macros, scripts, and so forth) suitable for receiving and processing interactions and/or inputs of the user 110. In particular embodiments, the application layer 154 may include any software layer, middleware layer, or software or middleware system suitable for servicing and processing communications, data transfers, network protocols, and authentication and authorization data between any number of XR applications 103 executing within the XR environment 102 as executed by the XR device 104.

In particular embodiments, the XR service layer 156 may include any software layer, middleware layer, or software or middleware system (e.g., operating system, edge operating system, and so forth) suitable for hosting and servicing the XR environment 102 as executed by the XR devices 104, 106. For example, in one embodiment, the XR service layer 156 may include one or more of a Platform as a Service (PaaS) layer, a Software as a Service (SaaS) layer, an Infrastructure as a Service (IaaS) layer, a Compute as a Service (CaaS) layer, a Data as a Service (DaaS) layer, a Database as a Service (DBaaS) layer, or other similar cloud-based computing architecture (e.g., "X" as a Service (XaaS)) suitable for hosting and servicing the XR environment 102.

In particular embodiments, the XR service layer 156 may also be suitable for performing one or more machine-learning based algorithms. For example, the XR service layer 156 may be configured to identify the users 110, 112 using any suitable face-tracking algorithm, eye-tracking algorithm, gesture recognition algorithm, and so forth. In one embodiment, the XR service layer 156 identifies the users 110, 112 by searching for each users' 110 image in the user profile 162 in memory 160, and for each of the users 110, 112, matching users' 110, 112 image to one of the stored user's profiles 164. In particular embodiments, the users' profile 162 in memory 160 includes users' authority level 166 that indicates which content 174 containing sensitive information, the user 110, 112 are authorized to view.

For example, a first viewer among users 110, 112 with a low authority level 166 is authorized to view content 174 with a low sensitivity level 176. A second viewer among users 110, 112 with a high authority level 166 is authorized to view content 174 with low to high sensitivity levels 176. The authority level 166 of each of the users 110, 112 may be stored in their respective user's profile 164. Once the XR service layer 156 determines the identity of users 110, 112, the XR service layer 156 searches the users' profile 162 and matches the users 110, 112 image to one of the user's profiles 164.

In particular embodiments, the proximity threshold dataset 178 may also include tables for different content 174, different item sensitivity levels 176, different XR device 106 and/or second user avatar 116 virtual locations, and/or the like. For example, a first table may include distances from XR device 106 and/or second user avatar 116, from which the same image with different virtual locations is identifiable. A second table may include distances from XR device 106 and/or second user avatar 116, from which the same text with different font virtual locations is identifiable. A third table may include distances from XR device 106 and/or second user avatar 116, from which the same image with the same virtual location but different resolutions is identifiable. A fourth table may include distances from the XR device 106 and/or second user avatar 116 with different virtual locations, from which the same image is identifiable. Then, based on these data points, a proximity threshold 117 for content 174 that has the same or closest data point to a particular datapoint may be determined.

Verifying and Authenticating User Interactions in Extended Reality Environments

Embodiments of the present disclosure discuss techniques system for verifying and authenticating user interactions within extended reality (XR) environments.

Figure 2:
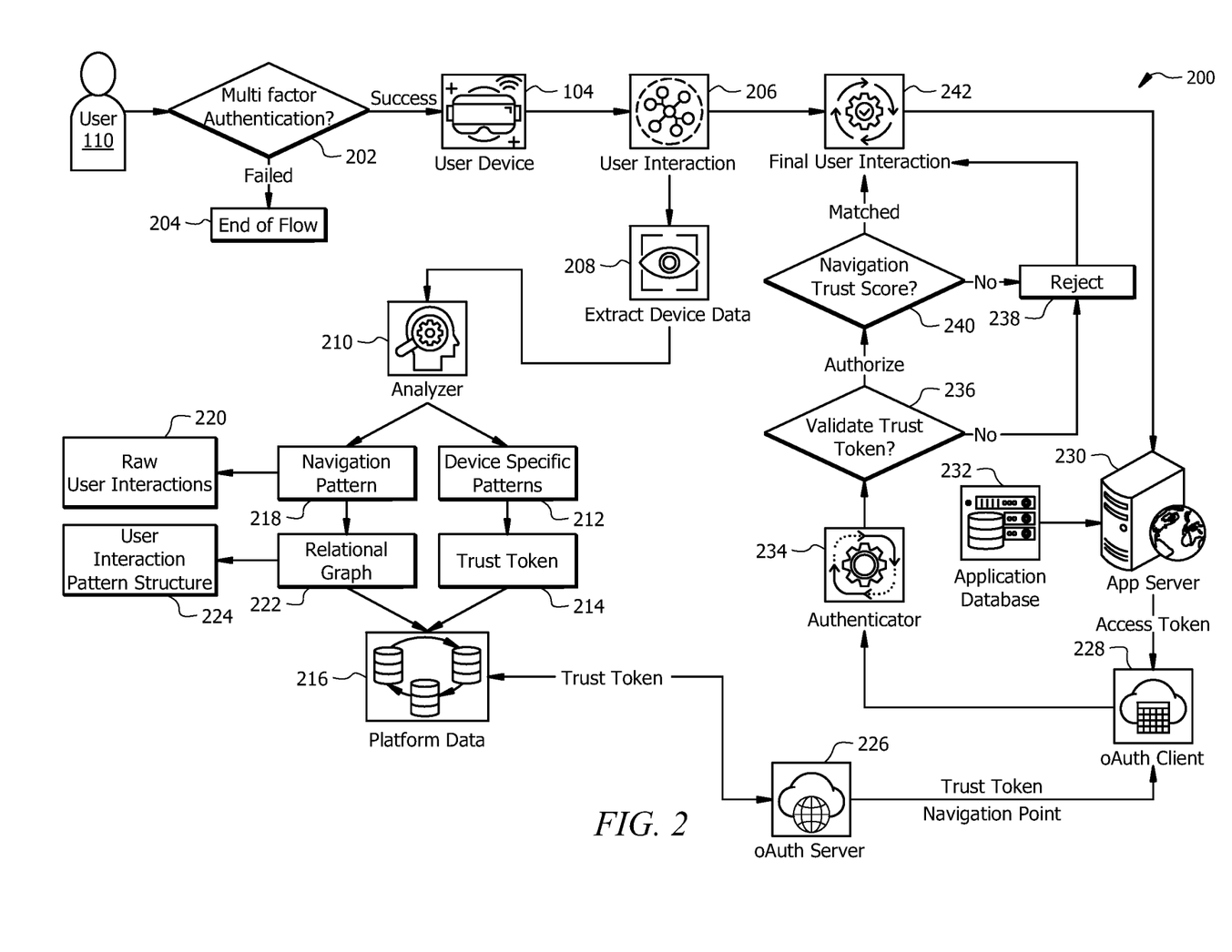
FIG. 2 is an embodiment of a workflow diagram of an extended reality (XR) system for verifying and authenticating user interactions within XR environments, in accordance with certain aspects of the present disclosure.

FIG. 2 is an embodiment of a workflow diagram 200 of an extended reality (XR) system for verifying and authenticating user interactions within XR environments, in accordance with certain aspects of the present disclosure. In particular embodiments, the workflow diagram 200 may be performed by the XR service layer 156 and/or a combination of the XR service layer 156 and the application layer 154 as executed by the processor 150 discussed above with respect to FIG. 1. In particular embodiments, the workflow diagram 200 may begin with the XR service layer 156 allowing the user 110 wearing the XR device 104 to perform an initial XR service authentication 202 upon launch of the XR environment 102 on the XR device 104. For example, in one embodiment, the initial XR service authentication 202 may include a multifactor authentication (MFA) in which the user 110 may input one or more identification data (e.g., user identification data, personal identification data, user avatar identification data) using the XR device 104 and/or mobile device 104.

In particular embodiments, the workflow diagram 200 may further include the XR service layer 156 tracking and analyzing (e.g., in the background) user interactions 206 as the user 110 interacts with the XR application 103 executing within the XR environment 103. In particular embodiments, the user interactions 206 may include, for example, one or more user inputs (e.g., eye-gaze input, face expression input, tactile input, a head pose input, a hand gesture, a full-body gesture, a voice input, biometric input, and so forth) suitable for conveying a user intent with respect to the XR application 103. In particular embodiments, the workflow diagram 200 may further include the XR service layer 156 extracting device data 208 based on sensor data obtained by one or more sensors of the XR device 104 as the user 110 interacts with the XR application 103.

For example, in particular embodiments, the extracted device data 208 may include an indication of one or more device capabilities of the XR device 104, such as an eye-tracking capability, a face-tracking capability, a haptic feedback capability, a head pose tracking capability, a hand tracking capability, a full-body tracking capability, a voice control capability, a biometric input capability, or other device data that may be associated with the particular XR device 104. In particular embodiments, the workflow diagram 200 may then continue with the XR service layer 156 utilizing a data analyzer 210 to identify a device-specific pattern 212 based on the extracted device data 208 and a historical user interaction navigation pattern 218 based on the extracted device data 208 and raw user interactions 220 (e.g., visual data representative of individual user selections, user clicks, user points, user gestures, and the respective locations thereof).

In particular embodiments, the device-specific pattern 212 may include, for example, one or more patterns associated with the user input modality (e.g., eye-gaze input modality, face expression input modality, tactile input modality, a head pose input modality, a hand gesture input modality, a full-body gesture input modality, voice input modality, biometric input modality, and so forth) utilized by the user 110 to perform user interactions with respect to the identified device capabilities of the XR device 104.

Similarly, in particular embodiments, the historical user interaction navigation pattern 218 may include, for example, one or more patterns associated with the manner in which the user 110 performs a sequence of user interactions 206 (e.g., a head pose pattern of the user 110 while performing a sequence of user interactions 206, an eye gaze pattern of the user 110 while performing a sequence of user interactions 206, a hand gesture pattern of the user 110 while performing a sequence of user interactions 206, a full-body movement pattern of the user 110 while performing a sequence of user interactions 206, a clickstream of the user 110 while performing a sequence of user interactions 206, and so forth) with respect to the XR application 103.

For example, in particular embodiments, the historical user interaction navigation pattern 218 may be identified by deriving a relational graph 222 representative of a pattern structure 224 of the sequence of user interactions 206 with the XR application 103. In particular embodiments, as will be further described below by FIGS. 3A and 3B, the derived relational graph 222 may include any graph structure, which includes a number of individual nodes each corresponding to a respective one of the sequence of user interactions 206 with the XR application 103.

In particular embodiments, the workflow diagram 200 may then include the XR service layer 156 generating a service trust token 214 based on the device-specific pattern 212 and the historical user interaction navigation pattern 218. In particular embodiments, the workflow diagram 200 may then include the XR service layer 156 storing the service trust token 214 and the derived relational graph 222 to a service database 216. In particular embodiments, upon determining that the user 110 intends to finalize an execution of a particular sequence of user interactions 206 with the XR application 103 based on the user's performance of a final interaction 242, the workflow diagram 200 may include the XR service layer 156 requesting an access trust token 231 associated with the XR application 103 from an application server 230 and application database 232. For example, in particular embodiments, the access trust token 231 may include any access token (e.g., user authentication credential) suitable for permitting user 110 access to an application programming interface (API) associated with the XR application 103 to perform one or more specific actions.

In particular embodiments, the workflow diagram 200 may include the XR service layer 156 comparing the service trust token 214 and the access trust token 231 in order to verify and authenticate the user 110 with respect to the XR application 103 via an authentication server 226 running on the XR service layer 156 and/or an authentication client 228 running on the application layer 154. In particular embodiments, the workflow diagram 200 may then include the XR service layer 156 verifying and authenticating the user 110 with respect to the XR application 103 by determining (at validate trust token functional block 236) whether the service trust token 214 matches to the access trust token 231 by way of an authenticator 234.

In particular embodiments, in response to determining (at validate trust token functional block 236) that the service trust token 214 does not match to the access trust token 231, the workflow diagram 200 may include the XR service layer 156 rejecting (at rejection functional block 238) the finalization of the execution of the sequence of user interactions 206 with the XR application 103. On the other hand, in response to determining (at validate trust token functional block 236) that the service trust token 214 matches to the access trust token 231, the workflow diagram 200 may then include the XR service layer 156 generating and verifying a navigation trust score (at validate trust token functional block 240) for the user 110.

For example, in particular embodiments, the XR service layer 156 may generate and verify the navigation trust score (at validate trust token functional block 240) for the user 110 by comparing each user interaction of the sequence of user interactions 206 with the XR application 103 with the identified the historical user interaction navigation pattern 218 to verify and authenticate, for example, that this particular user 110 is in fact the user 110 that performed the particular sequence of user interactions 206. In particular embodiments, in response to determining that each user interaction of the sequence of user interactions 206 with the XR application 103 does not match to, or accord with, the identified the historical user interaction navigation pattern 218 based on the navigation trust score (at validate trust token functional block 240), the workflow diagram 200 may include the XR service layer 156 rejecting (at rejection functional block 238) the finalization of the execution of the sequence of user interactions 206 with the XR application 103.

On the hand, in response to determining that each user interaction of the sequence of user interactions 206 with the XR application 103 matches to, or accords with, the identified the historical user interaction navigation pattern 218 based on the navigation trust score (at validate trust token functional block 240), the workflow diagram 200 may include the XR service layer 156 allowing finalization of the execution of the sequence of user interactions 206 with the XR application 103 based on the user's performance of the final interaction 242. For example, in one embodiment, the finalization of the execution of the sequence of user interactions 206 with the XR application 103 may include, for example, causing the XR application 103 to execute a predetermined action (e.g., launch a web page, compute a result, execute a transmission of data, execute a reception of data, transform an object, alter an object, display a widget, update and redisplay a widget, launch another XR application, change a state, and so forth).

In accordance with the presently disclosed embodiments, by allowing finalization of the execution of the sequence of user interactions 206 with the XR application 103 only when the XR service layer 156 has determined that each user interaction of the sequence of user interactions 206 with the XR application 103 matches to, or accords with, the identified historical user interaction navigation pattern 218, the present embodiments may improve XR systems by providing a verification and authentication process specifically suited for XR environments to secure sensitive data and user interactions exchanged and/or executed within XR environments.

Figure 3A:
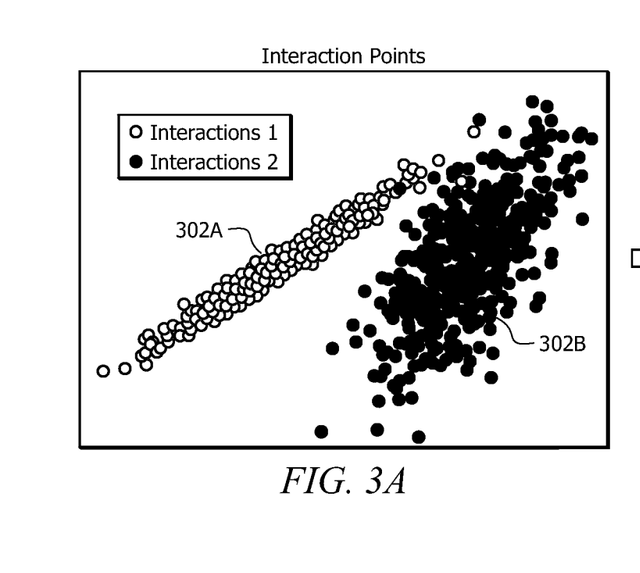
FIGS. 3A and 3B illustrate a diagram of user interaction points and a diagram of relational graphs of user interactions, respectively, in accordance with certain aspects of the present disclosure.
Figure 3B:
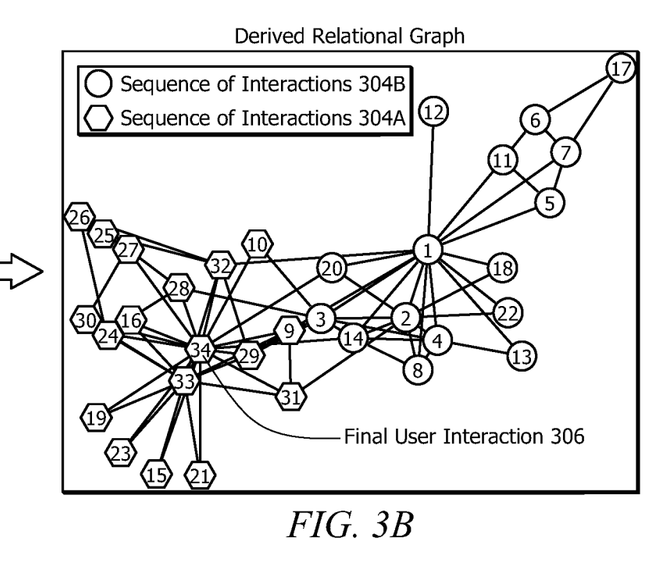

FIGS. 3A and 3B illustrate a diagram of user interaction points 300A and a diagram of relational graphs of user interactions 300B, respectively, in accordance with certain aspects of the present disclosure. As depicted by FIG. 3A, the diagram of user interaction points 300A may include a first aggregate of interactions 302A and a second aggregate of interactions 302B. In particular embodiments, the first aggregate of interactions 302A and the second aggregate of interactions 302B may each include, for example, raw visual data representative of individual user selections, user clicks, user points, user gestures, and the respective locations thereof, that may be tracked and recorded as the user 110 performs user interactions with the XR application 103.

As depicted by FIG. 3B, the diagram of relational graphs of user interactions 300B may include a first sequence of user interactions 304A and a second sequence of user interactions 304B. For example, in particular embodiments, the first sequence of user interactions 304A and the second sequence of user interactions 304B may each include, for example, a derived relational graph representative of a pattern structure of the particular sequences of user interactions with the XR application. For example, as further depicted, the first sequence of user interactions 304A and the second sequence of user interactions 304B may each include a number of individual and sequential nodes (e.g., "1", "2", "3", "4", and "5", . . . "N") each corresponding to a respective user interaction of the sequence of user interactions 304A, 304B with the XR application. In accordance with the presently disclosed embodiments, the first sequence of user interactions 304A and the second sequence of user interactions 304B may each be tracked until a final node or interaction to finalize execution of the sequence of user interactions 306 is performed by the user 110. The derived relational graph may then be recorded and stored as being representative of an identified historical user interaction navigation pattern for the user 110 in accordance with the presently disclosed embodiments.

Figure 4:
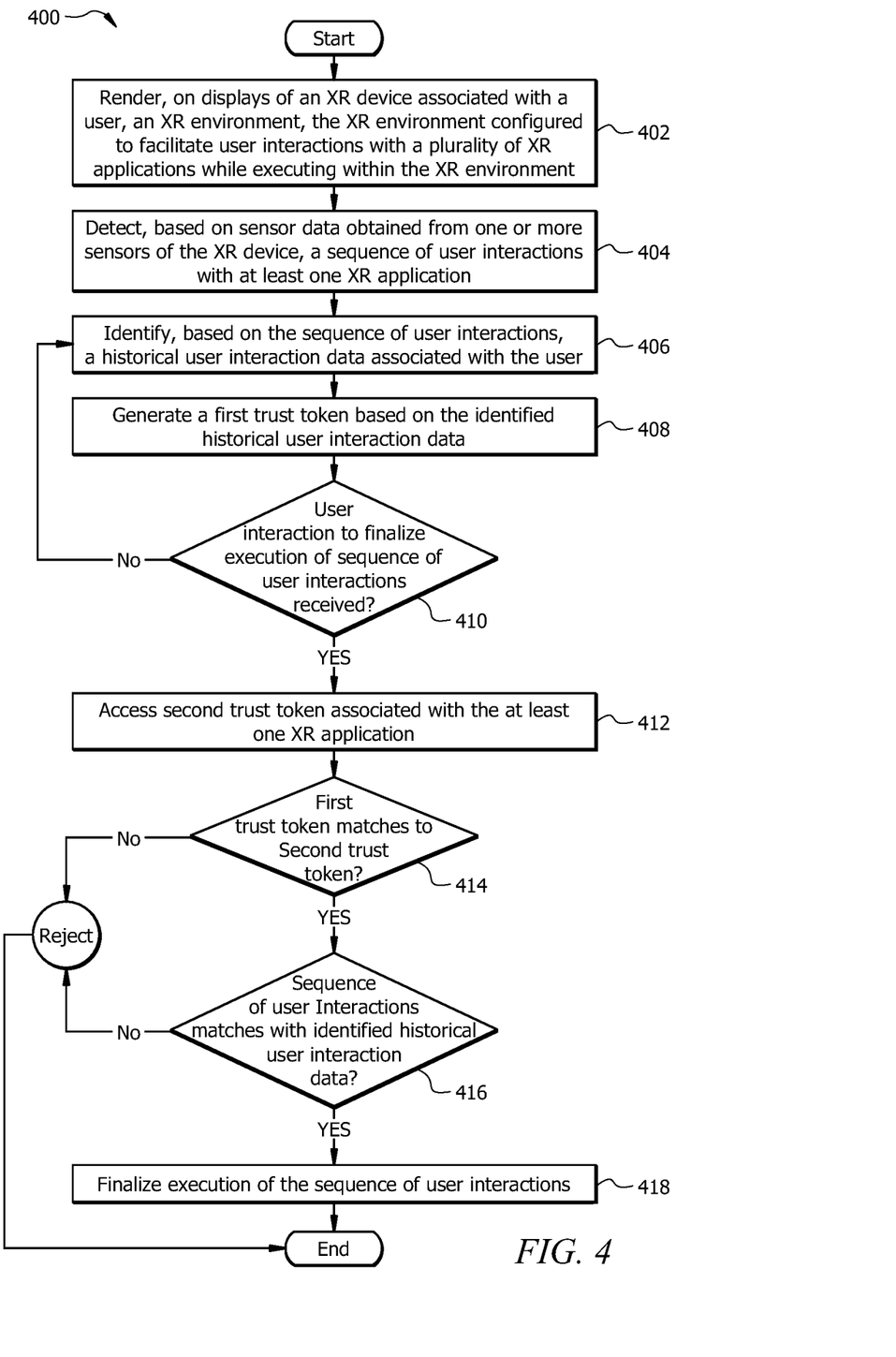
FIG. 4 illustrates a flowchart of an example method for verifying and authenticating user interactions within extended reality (XR) environments, in accordance with one or more embodiments of the present disclosure.

FIG. 4 illustrates a flowchart of an example method 400 for verifying and authenticating user interactions within extended reality (XR) environments, in accordance with one or more embodiments of the present disclosure. The method 400 may be performed by the system and network 100 as described above with respect to FIG. 1. The method 400 may begin at block 402 with the XR system 140 rendering on one or more displays of an XR device 104 an extended reality (XR) environment 102. For example, in one embodiment, the XR environment 102 may include any XR environment (e.g., VR environment, AR environment, MR environment, and so forth) suitable for facilitating user interactions 206 with the XR application 103 while executing within the XR environment 102. The method 400 may continue at block 404 with the XR system 140 detecting, based on sensor data obtained from one or more sensors of the XR device 104, a sequence of user interactions 304A with the XR application 103.

In particular embodiments, the method 400 may continue at block 406 with the XR system 140 identifying, based on the sequence of user interactions 304A with the XR application 103 and a user identification, a historical user interaction data associated with the user 110. For example, in particular embodiments, the historical user interaction data associated with the user 110 may include the user navigation patterns 218 and the device-specific patterns 212. In particular embodiments, the method 400 may continue at block 408 with the XR system 140 generating a first trust token 214 based on the identified historical user interaction data associated with the user 110.

In particular embodiments, the method 400 may continue at decision 410 with the XR system 140 determining whether a final user interaction 306 to finalize the sequence of user interactions 304A has been received. In particular embodiments, in response to determining that the final user interaction 306 to finalize the sequence of user interactions 304A has been received, the method 400 may then continue at block 412 with the XR system 140 accessing a second trust token associated with the XR application 103. For example, in particular embodiments, the XR system 140 may receive, from the XR application 103, the second trust token 231, which may include an access token suitable for permitting access to an API associated with the XR application 103. In response to determining that the final user interaction 306 to finalize the sequence of user interactions 304A has not been received, the method 400 may return to block 406.

In particular embodiments, the method 400 may continue at decision 414 with the XR system 140 determining whether the first trust token 214 matches to the second trust token 231. For example, in particular embodiments, the XR system 140 may validate the second trust token 231 based on a comparison of the first trust token 214 with the second trust token 231 to determine whether the first trust token 214 matches to the second trust token 231. In particular embodiments, in response to determining that the first trust token 214 does not match to the second trust token 231, the method 400 may conclude with the XR system 140 rejecting the execution of the sequence of user interactions 304A. In particular embodiments, in response to determining that the first trust token 214 matches to the second trust token 231, the method 400 may continue at decision 416 with the XR system 140 determining whether the sequence of user interactions 304A matches with the identified historical user interaction data associated with the user 110.

For example, in particular embodiments, the XR system 140 may validate each user interaction of the sequence of user interactions 304A based on the identified historical user interaction data associated with the user 110 by comparing each user interaction of the sequence of user interactions 304A against the identified historical user interaction data associated with the user 110. In particular embodiments, the method 400 may then conclude at block 418 with the XR system 140 finalizing execution of the sequence of user interactions 304A. For example, in particular embodiments, the XR system 140 may, in response to the final user interaction 306 to finalize the sequence of user interactions 304A (e.g., a confirmation interaction), may finalize execution of the sequence of user interactions 304A by causing the XR application 103 to execute a predetermined action (e.g., launch a web page, compute a result, execute a transmission of data, execute a reception of data, transform an object, alter an object, display a widget, update and redisplay a widget, launch another XR application, change a state, and so forth).

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112 (f) as it exists on the date of filing hereof unless the words "means for" or "step for" are explicitly used in the particular claim.

The invention claimed is:

1. A system, comprising:
a memory configured to store a user identification for a user, image data utilized to render an extended reality (XR) environment on an XR device associated with the user, and a plurality of XR applications executable within the XR environment; and
one or more processors operably coupled to the memory and configured to:
render, on one or more displays of the XR device, the XR environment, wherein the XR environment is configured to facilitate user interactions with the plurality of XR applications while executing within the XR environment;
detect, based on sensor data obtained from one or more sensors of the XR device, a sequence of user interactions with at least one XR application of the plurality of XR applications;
identify, based at least in part upon the sequence of user interactions with the at least one XR application and the user identification, a historical user interaction data associated with the user;
generate a first trust token based on the identified historical user interaction data; and
receive an interaction to finalize execution of the sequence of user interactions, and, in response:
access a second trust token associated with the at least one XR application;
compare the first trust token with the second trust token;
validate the second trust token based at least in part upon the comparison of the first trust token with the second trust token;
validate each user interaction of the sequence of user interactions based at least in part upon the identified historical user interaction data; and
in response to validating the second trust token and the user interactions of the sequence of user interactions, finalize execution of the sequence of user interactions.

2. The system of claim 1, wherein the one or more processors are configured to identify the historical user interaction data by deriving a relational graph based on the sequence of user interactions with the at least one XR application and the user identification.

3. The system of claim 2, wherein the derived relational graph comprises a plurality of nodes each corresponding to a respective one of the sequence of user interactions with the at least one XR application, and wherein a final node of the derived relational graph corresponds to the interaction to finalize execution of the sequence of user interactions.

4. The system of claim 1, wherein the one or more processors are further configured to:
determine, based on the sensor data, one or more device-specific patterns associated with the XR device; and
generate the first trust token based on the identified historical user interaction data and the one or more device-specific patterns.

5. The system of claim 1, wherein the one or more processors are further configured to:
receive, from the at least one XR application, the second trust token, wherein the second trust token comprises an access token configured to permit access to an application programming interface (API) associated with the at least one XR application; and
validate the second trust token based at least in part upon whether the first trust token matches to the second trust token.

6. The system of claim 1, wherein the one or more processors are configured to finalize execution of the sequence of user interactions by causing the at least one XR application to execute a predetermined action.

7. The system of claim 1, wherein the identified historical user interaction data comprises one or more of a head pose pattern of the user, an eye gaze pattern of the user, a hand gesture pattern of the user, a body movement pattern of the user, or a clickstream of the user.

8. A method, comprising:
rendering, on one or more displays of an extended reality (XR) device associated with a user, an XR environment, wherein the XR environment is configured to facilitate user interactions with a plurality of XR applications while executing within the XR environment;
detecting, based on sensor data obtained from one or more sensors of the XR device, a sequence of user interactions with at least one XR application of the plurality of XR applications;
identifying, based at least in part upon the sequence of user interactions with the at least one XR application and a user identification, a historical user interaction data associated with the user;
generating a first trust token based on the identified historical user interaction data; and
receiving an interaction to finalize execution of the sequence of user interactions, and, in response:

accessing a second trust token associated with the at least one XR application;

comparing the first trust token with the second trust token;

validating the second trust token based at least in part upon the comparison of the first trust token with the second trust token;

validating each user interaction of the sequence of user interactions based at least in part upon the identified historical user interaction data; and in response to validating the second trust token and the user interactions of the sequence of user interactions, finalizing execution of the sequence of user interactions.

9. The method of claim 8, wherein identifying the historical user interaction data comprises deriving a relational graph based on the sequence of user interactions with the at least one XR application and the user identification.

10. The method of claim 9, wherein the derived relational graph comprises a plurality of nodes each corresponding to a respective one of the sequence of user interactions with the at least one XR application, and wherein a final node of the derived relational graph corresponds to the interaction to finalize execution of the sequence of user interactions.

11. The method of claim 8, further comprising:

determining, based on the sensor data, one or more device-specific patterns associated with the XR device; and generating the first trust token based on the identified historical user interaction data and the one or more device-specific patterns.

12. The method of claim 8, further comprising:

receiving, from the at least one XR application, the second trust token, wherein the second trust token comprises an access token configured to permit access to an application programming interface (API) associated with the at least one XR application; and validating the second trust token based at least in part upon whether the first trust token matches to the second trust token.

13. The method of claim 8, wherein finalizing execution of the sequence of user interactions comprises causing the at least one XR application to execute a predetermined action.

14. The method of claim 8, wherein the identified historical user interaction data comprises one or more of a head pose pattern of the user, an eye gaze pattern of the user, a hand gesture pattern of the user, a body movement pattern of the user, or a clickstream of the user.

15. A non-transitory computer-readable medium storing instructions that, when executed by one or more processors of a system, cause the one or more processors to:

render, on one or more displays of an extended reality (XR) device associated with a user, an XR environment, wherein the XR environment is configured to facilitate user interactions with a plurality of XR applications while executing within the XR environment;

detect, based on sensor data obtained from one or more sensors of the XR device, a sequence of user interactions with at least one XR application of the plurality of XR applications;

identify, based at least in part upon the sequence of user interactions with the at least one XR application and a user identification, a historical user interaction data associated with the user;

generate a first trust token based on the identified historical user interaction data;

access a second trust token associating with the at least one XR application based at least in part upon; and receive an interaction to finalize execution of the sequence of user interactions, and, in response:

access a second trust token associated with the at least one XR application;

compare the first trust token with the second trust token;

validate the second trust token based at least in part upon the comparison of the first trust token with the second trust token;

validate each user interaction of the sequence of user interactions based at least in part upon the identified historical user interaction data; and in response to validating the second trust token and the user interactions of the sequence of user interactions, finalize execution of the sequence of user interactions.

16. The non-transitory computer-readable medium of claim 15, wherein the instructions to identify the historical user interaction data further cause the one or more processors to derive a relational graph based on the sequence of user interactions with the at least one XR application and the user identification.

17. The non-transitory computer-readable medium of claim 16, wherein the derived relational graph comprises a plurality of nodes each corresponding to a respective one of the sequence of user interactions with the at least one XR application, and wherein a final node of the derived relational graph corresponds to the interaction to finalize execution of the sequence of user interactions.

18. The non-transitory computer-readable medium of claim 15, wherein the instructions further cause the one or more processors to:

determine, based on the sensor data, one or more device-specific patterns associated with the XR device; and generate the first trust token based on the identified historical user interaction data and the one or more device-specific patterns.

19. The non-transitory computer-readable medium of claim 15, wherein the instructions further cause the one or more processors to:

receive, from the at least one XR application, the second trust token, wherein the second trust token comprises an access token configured to permit access to an application programming interface (API) associated with the at least one XR application; and validate the second trust token based at least in part upon whether the first trust token matches to the second trust token.

20. The non-transitory computer-readable medium of claim 15, wherein the identified historical user interaction data comprises one or more of a head pose pattern of the user, an eye gaze pattern of the user, a hand gesture pattern of the user, a body movement pattern of the user, or a clickstream of the user.

* * * * *